United States Patent [19]
Kim

[11] Patent Number: 5,937,090
[45] Date of Patent: Aug. 10, 1999

[54] IMAGE ENHANCEMENT METHOD AND CIRCUIT USING QUANTIZED MEAN-MATCHING HISTOGRAM EQUALIZATION

[75] Inventor: Yeong-taeg Kim, Suwon, Rep. of Korea

[73] Assignee: Samsung Electronics Co., Ltd., Kyungki-Do, Rep. of Korea

[21] Appl. No.: 08/914,266

[22] Filed: Aug. 19, 1997

[30] Foreign Application Priority Data

Aug. 19, 1996 [KR] Rep. of Korea ................. 96-34281
Oct. 9, 1996 [KR] Rep. of Korea ................. 96-44917

[51] Int. Cl.[6] .......................... G06K 9/00; G06T 5/40
[52] U.S. Cl. ................................... 382/169; 382/274
[58] Field of Search .............................. 382/168, 169, 382/274, 300, 254, 171, 172, 299; 358/455, 522, 447

[56] References Cited

U.S. PATENT DOCUMENTS

| 5,808,697 | 9/1998 | Fujimura et al. | 382/168 |
| 5,857,033 | 1/1999 | Kim | 382/168 |
| 5,862,254 | 1/1999 | Kim | 382/168 |

*Primary Examiner*—Scott Rogers
*Attorney, Agent, or Firm*—Sughrue, Mion, Zinn, Macpeak & Seas, PLLC

[57] ABSTRACT

An image enhancement circuit and a method therefor including the steps of quantizing the level of an input image signal, obtaining a cumulative density function on the basis of a gray level distribution of a screen unit with respect to the quantized image signal, outputting a cumulative density function value interpolated on the basis of the quantized cumulative density function value, calculating the mean level of the input image signal in a screen unit, and controlling a transform function to map the input image signal to a gray level and map the mean level to itself, by using the interpolated cumulative density function as the transform function. In addition, the image enhancement method includes the steps of outputting a compensated mean level by adding a corrected value depending on a predetermined correction function to the mean level, and controlling the interpolated cumulative density function as a transform function to map an input image signal to a new gray level on the basis of the interpolated cumulative density function value and to map the mean level to the compensated mean level. Thus, contrast is enhanced, and the mean brightness of a given image is continuously maintained.

26 Claims, 6 Drawing Sheets

IMAGE ENHANCEMENT METHOD AND CIRCUIT USING QUANTIZED MEAN-MATCHING HISTOGRAM EQUALIZATION

BACKGROUND OF THE INVENTION

The present invention relates to enhancement of the quality of an image, and more particularly, to an image enhancement circuit and a method for image enhancement using quantized mean-matching histogram equalization.

The basic operation of histogram equalization is to convert an input image on the basis of the histogram of the input image, wherein a histogram denotes the gray level distribution of an input image.

The histogram of a gray level provides an overall depiction of the appearance of an image. A gray level properly controlled according to a sample distribution of an image improves the appearance or contrast of an image.

Histogram equalization, as a method for enhancing the contrast of a given image according to a sample distribution of the image, is the most widely known of the various methods for contrast enhancement, and is disclosed in the following documents: [1] J. S. Lim, "Two-Dimensional Signal and Image Processing, Prentice Hall," Englewood Cliffs, N.J., 1990; and [2] R. C. Gonzalez and P. Wints, "Digital Image Processing," Addison-Wesley, Reading, Mass., 1977.

Also, a useful application of a histogram equalization method in the fields of medical image processing and radar image processing is disclosed in the following documents: [3] J. Zimmerman, S. Pizer, E. Staab, E. Perry, W. McCartney, and B. Brenton, "Evaluation of the Effectiveness of Adaptive Histogram Equalization for Contrast Enhancement," IEEE Tr. on Medical Imaging, pp. 304–312, December 1988; and [4] Y. Li, W. Wang, and D. Y. Yu, "Application of Adaptive Histogram Equalization to X-ray Chest Image," Proc. of the SPIE, pp. 513–514, vol. 2321, 1994.

Accordingly, a technique using a histogram of a given image has been usefully applied to various fields such as medical image processing, infrared image processing, radar image processing, etc.

In general, since histogram equalization has an effect of stretching a dynamic range, it can flatten the distribution density of a resultant image, thereby enhancing the contrast of an image. However, such characteristics of histogram equalization can become a disadvantage in practical applications. That is, since the output density of histogram equalization is constant, the mean brightness of an output image approaches a middle gray level. In practice, in order to accomplish histogram equalization for an analog image, the mean brightness of an output image in histogram equalization is an exact middle gray level regardless of the mean brightness of an input image. Obviously, this characteristic is not desirable for practical applications. For instance, a problem occurs in that a scene photographed at night appears extremely bright after histogram equalization.

Furthermore, a conventional histogram equalization circuit needs a configuration for storing generated frequencies of every gray level, which increases hardware costs. For example, if a gray level (L) is 256, 256 memory devices are required to store the generated frequencies of every gray level, and 256 accumulators are required to accumulate the generated frequencies of every gray level.

SUMMARY OF THE INVENTION

It is an object of the present invention to provide an image enhancement method for controlling a transform function so that the mean level of a given image is mapped to itself during histogram equalization using a cumulative density function, obtained by interpolating a quantized cumulative density function of a given image, as the transform function.

It is another object of the present invention to provide an image enhancement method for controlling a transform function so that the mean level of an input image is mapped to the desired output mean during histogram equalization using a cumulative density function, obtained by interpolating a quantized cumulative density function of an input image, as the transform function.

It is still another object of the present invention to provide an image enhancement circuit for controlling a transform function so that the mean level of a given image is mapped to itself during histogram equalization using a cumulative density function, obtained by interpolating a quantized cumulative density function of a given image, as the transform function.

It is yet another object of the present invention to provide an image enhancement circuit for controlling a transform function so that the mean level of an input image is mapped to the desired output mean during histogram equalization using a cumulative density function, obtained by interpolating a quantized cumulative density function of an input image, as the transform function.

To accomplish the first object, there is provided an image enhancement method according to the present invention comprising the steps of: quantizing the level of an input image signal and outputting a quantized image signal; obtaining a cumulative density function on the basis of a gray level distribution of a screen unit with respect to the quantized image signal and outputting a quantized cumulative density function value; interpolating the quantized cumulative density function value and outputting an interpolated cumulative density function value; calculating a mean level of an input image signal in a screen unit; and controlling a transform function so that the input image signal can be mapped to a gray level and the mean level can be mapped to itself, by using the interpolated cumulative density function as a transform function.

To accomplish the second object, there is provided an image enhancement method according to the present invention comprising the steps of: quantizing the level of an input image signal and outputting a quantized image signal; obtaining a cumulative density function on the basis of a gray level distribution of a screen unit with respect to the quantized image signal and outputting a quantized cumulative density function value; interpolating the quantized cumulative density function value and outputting an interpolated cumulative density function value; calculating a mean level of an input image signal in a screen unit; adding a corrected value depending on a predetermined correction function based on the mean brightness of the input image signal to the mean level and outputting a compensated mean level; and controlling a transform function so that the input image signal can be mapped to a new gray level on the basis of an interpolated cumulative density function value and the mean level can be mapped to the compensated mean level, by using the interpolated cumulative density function as the transform function.

To accomplish the third object, a quantizer of an image enhancement circuit according to the present invention quantizes the level of an input image signal and outputs a quantized image signal. A first calculator calculates a cumulative density function on the basis of a gray level distribution of a screen unit with respect to the quantized image signal and outputs a quantized cumulative density function value. A second calculator calculates a mean level of an input image signal in a screen unit. An interpolator interpolates the quantized cumulative density function value and outputs an interpolated cumulative density function value. A mapper controls the transform function so that the input image signal can be mapped to a gray level and the mean level calculated by the second calculator can be mapped to itself, by using the interpolated cumulative density function as a transform function.

To accomplish the fourth object, a quantizer of an image enhancement circuit according to the present invention quantizes the level of an input image signal and outputs a quantized image signal. A first calculator calculates a cumulative density function on the basis of a gray level distribution of a screen unit with respect to the quantized image signal and outputs a quantized cumulative density function value. A second calculator calculates a mean level of an input image signal in a screen unit. A brightness compensator outputs a compensated mean level by adding a corrected value depending on a predetermined correction function based on the mean brightness of the input image signal to the mean level. An interpolator interpolates the quantized cumulative density function value and outputs an interpolated cumulative density function value. A mapper controls the transform function so that the input image signal can be mapped to a new gray level and the mean level can be mapped to the compensated mean level, by using the interpolated cumulative density function as a transform function.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, an image enhancement method using quantized mean-matching histogram equalization proposed by the present invention will be described.

$\{X\}$ denotes a given image, and $X_m$ denotes the mean level of the given image $\{X\}$.

The given image $\{X\}$ is composed of L discrete gray levels $\{X_0, X_1, \ldots, X_{L-1}\}$, wherein $X_0 = 0$ represents a black level and $X_{L-1} = 1$ represents a white level. Also, $X_m \in \{X_0, X_1, \ldots, X_{L-1}\}$ is assumed.

The original discrete input levels $\{X_0, X_1, \ldots, X_{L-1}\}$ are quantized to Q discrete levels which are defined as $\{Z_0, Z_1, \ldots, Z_{Q-1}\}$, wherein it is supposed that $Z_{Q-1}$ is equal to $X_{L-1}$, Q is smaller than or equal to L, and $\{Z_0, Z_1, \ldots, Z_{Q-1}\} \subset \{X_0, X_1, \ldots, X_{L-1}\}$.

Figure 1:
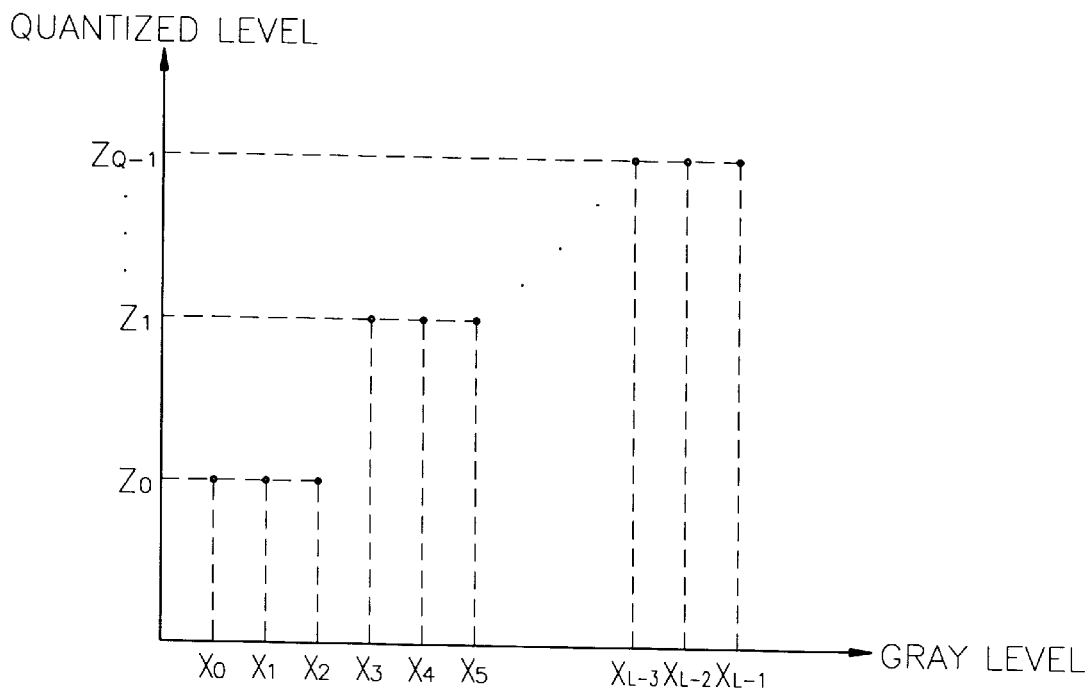
FIG. 1 shows an example of quantization of an L-level discrete signal into a Q-level discrete signal for explaining the quantization concept according to the present invention.

An example of quantization of an L-level discrete signal to a Q-level discrete signal is shown in FIG. 1. Also, $Q[X_k]$ is a quantization operation, which is defined by:

$$Q[X_k] = Z_q, \text{ if } Z_{q-1} < X_K < Z_q.$$

When $\{Z\}$ is set to be $Q[\{X\}]$, $\{Z\}$ represents a quantized input image.

The probability density function (PDF) of the quantized input image $\{Z\}$ can be expressed by Equation (1):

$$P(Z_q) = \frac{N_q}{N}, \tag{1}$$

wherein $P(Z_q)$ is the probability of a q-th quantized gray level $(Z_q)$, $N_q$ denotes the number of times in which the level $(Z_q)$ appears in the quantized image $\{Z\}$, and N denotes the number of total samples of the quantized image $\{Z\}$.

Here, a cumulative density function (CDF) of the quantized input image $\{Z\}$ can be expressed by Equation (2):

$$C(Z_q) = \sum_{j=0}^{q} P(Z_j), \tag{2}$$

wherein $C(Z_{Q-1})$ is equal to 1.

Figure 2:
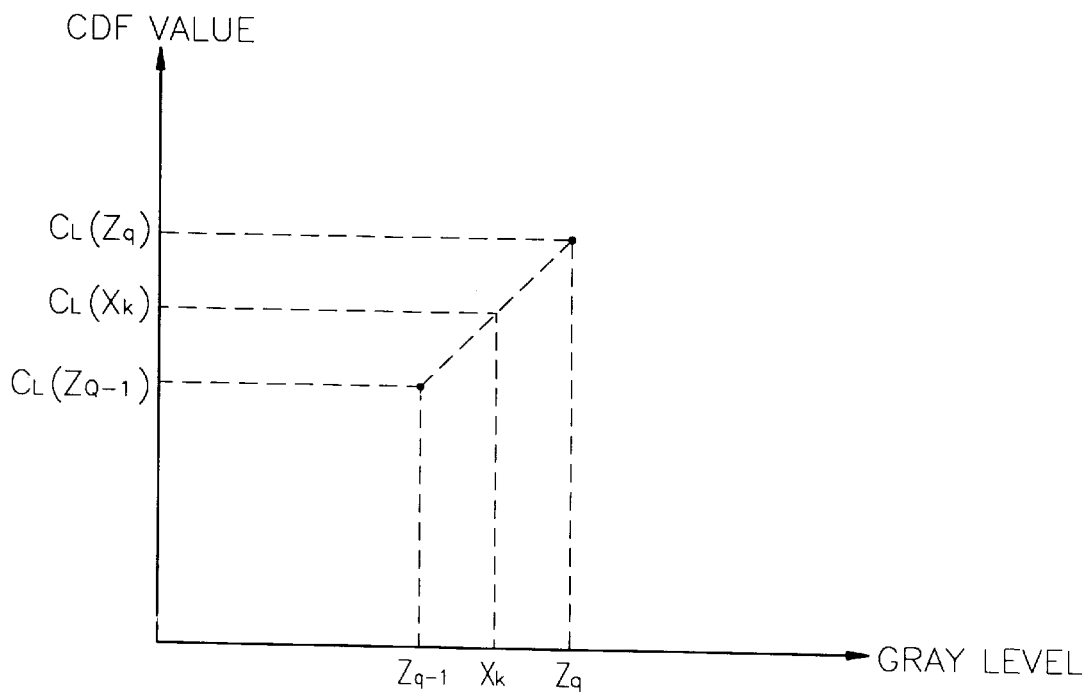
FIG. 2 is a graph for explaining an interpolation concept which is applied to the present invention.

A cumulative density function $c(X_k)$ of samples prior to being quantized can be approximately calculated from a cumulative density function $C(Z_q)$ of quantized samples by linear interpolation as shown in FIG. 2.

When $Q[X_k]$ is $Z_q$, assuming that $Z_{-1}$ is 0, the $c(X_k)$ is linearly interpolated as shown in Equation 3:

$$c(X_k) = C(Z_{q-1}) + [C(Z_q) - C(Z_{q-1})] \frac{X_k - Z_{q-1}}{Z_q - Z_{q-1}}. \tag{3}$$

Also, the $c(X_m)$ can be approximately calculated from Equation (3).

The most serious problem of histogram equalization is that the mean brightness between input and output signals may be remarkably changed according to a cumulative density function which is used as a transform function.

In order to solve this problem, the present invention proposes the following mapping operation based on the mean of an input image by combination with a cumulative density function obtained by linear interpolation:

$$Y_H = \begin{cases} \dfrac{c(X_k)}{c(X_m)} X_m, & \text{if } X_k \leq X_m \\ X_m + (X_{L-1} - X_m) \dfrac{c(X_k) - c(X_m)}{1 - c(X_m)}, & \text{if } X_k > X_m. \end{cases} \tag{4}$$

Here, an input sample lower than or equal to a mean level $(X_m)$ is mapped into a gray level from $X_0$ to $X_m$ by a transform function $$\frac{c(X_k)}{c(X_m)} X_m,$$

and an input sample higher than the mean level ($X_m$) is mapped into a gray level from $X_{m+1}$ to $X_{L-1}$ by a transform function $$X_m + (X_{L-1} - X_m) \frac{c(X_k) - c(X_m)}{1 - c(X_m)}.$$

It can be recognized from Equation (4) that the $X_m$ is mapped into the $X_m$ itself.

Accordingly, when a given image is histogram-equalized according to an interpolated cumulative density function calculated through linear interpolation of a quantized cumulative density function, the mean brightness of a given image is prevented from being changed by the histogram equalization, by controlling the transform function based on an interpolated cumulative density function as shown in Equation (4) so that the mean level of a given image can be mapped back into itself, which is called "quantized mean-matching histogram equalization".

Also, the present invention proposes the following mapping operation, which also performs as brightness compensation, when the mean brightness of a given image is extremely dark or bright, by combination with a cumulative density function obtained by linear interpolation.

$$Y_H = \begin{cases} \frac{c(X_k)}{c(X_m)} B_m, & \text{if } X_k \leq X_m \\ B'_m + (X_{L-1} - B'_m) \frac{c(X_k) - c(X_m)}{1 - c(X_m)}, & \text{if } X_k > X_m \end{cases} \quad (5)$$

Here, $B_m = X_m + \Delta$ . . . (6), wherein $B_m$ is a compensated mean level, and if $\Delta$ is set to be a corrected value which is obtained by a predetermined correction function depending on the mean brightness, the compensated mean level ($B_m$) becomes a result obtained by adding the corrected value ($\Delta$) to the mean level ($X_m$) of a given image. Here, it is assumed that $B_m \subset \{X_0, X_1, \ldots, X_{L-1}\}$. Also, $B_m' = B_m + X_{L-1}/(L-1)$ . . . (7), wherein $B_m'$ represents a first gray level which is mapped in a level region higher than the compensated mean level ($B_m$).

Accordingly, when the corrected value is greater than 0 ($\Delta > 0$), the mean brightness of an improved output ($Y_H$) increases, and when the corrected value is smaller than 0 ($\Delta < 0$), the mean brightness of the improved output ($Y_H$) decreases. As $\Delta$ increases, the dynamic range in a lower gray level region increases. As $\Delta$ decreases, the dynamic range in an upper gray level increases.

Consequently, an input sample lower than or equal to a mean level ($X_m$) is mapped into a gray level from $X_0$ to $X_m$ by a transform function $$\frac{c(X_k)}{c(X_m)} B_m,$$

and an input sample higher than the mean level ($X_m$) is mapped into a gray level from B' to $X_{L-1}$ by a transform function $$B_m + (X_{L-1} - B'_m) \frac{c(X_k) - c(X_m)}{1 - c(X_m)}.$$

It can be recognized from Equation (5) that the $X_m$ is mapped back into the $B_m$.

The quantized mean-matching histogram equalization using the mean level ($B_m$) properly compensated according to the mean level ($X_m$) of a given image, i.e., according to whether it is bright or dark can greatly enhance the image quality of an input image.

Now, embodiments of an image enhancement circuit according to the present invention will be described referring to FIGS. 3 through 8.

Figure 3:
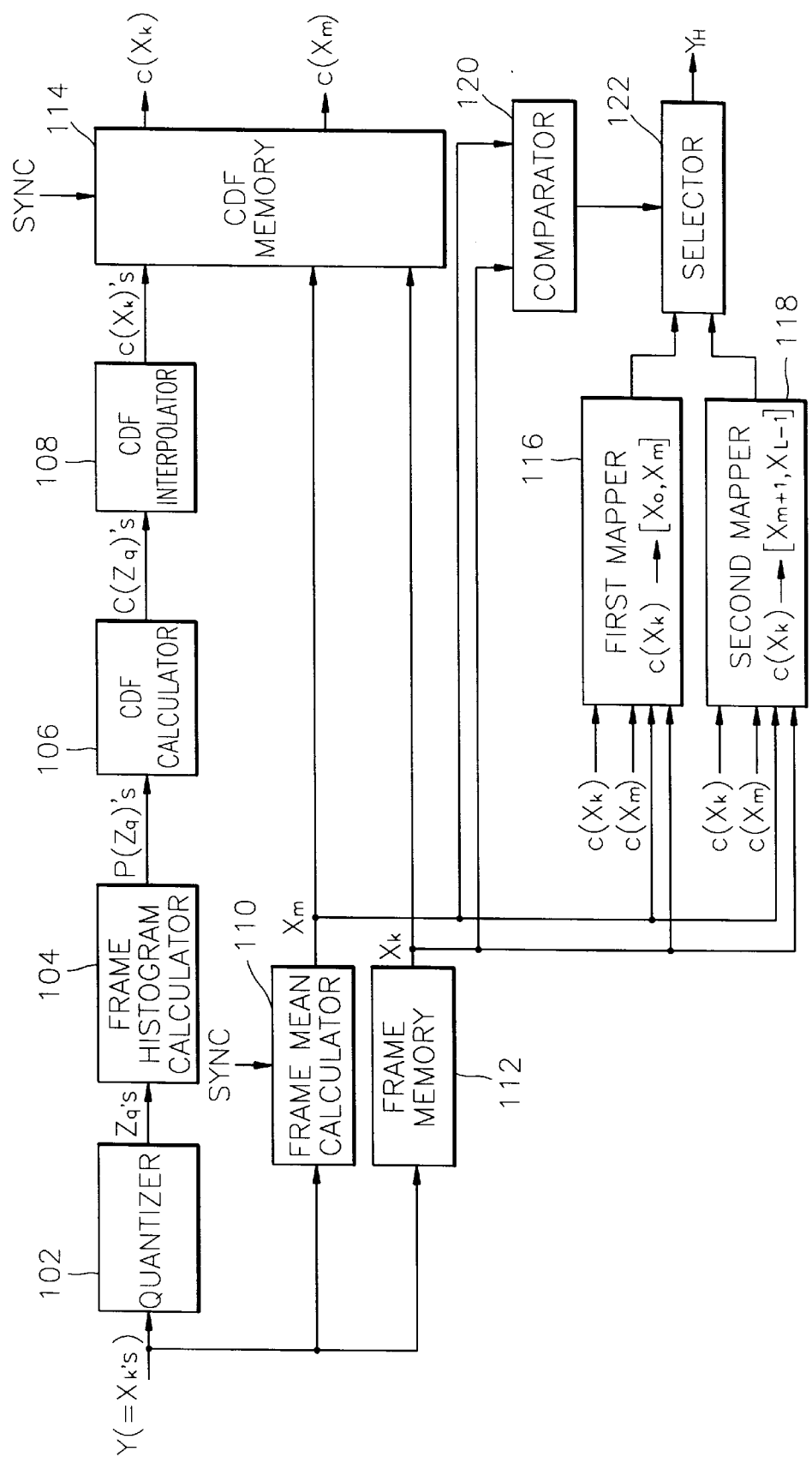
FIG. 3 is a block diagram of an image enhancement circuit according to an embodiment of the present invention.

FIG. 3 is a block diagram of an image enhancement circuit using quantized mean-matching histogram equalization according to an embodiment of the present invention. Referring to FIG. 3, a quantizer 102 quantizes an L-level input image ($X_k$'s) into a Q-level and generates a quantized image ($Z_q$'s). A frame histogram calculator 104 calculates the distribution of a gray level with respect to the quantized image ($Z_q$'s) in a unit of one screen and calculates a probability density function (P($Z_q$)'s) using Equation (1). Here, the screen unit can be a field, but is set to be a frame.

A CDF calculator 106 calculates a quantized cumulative density function (C($Z_q$)'s) using Equation (2) on the basis of the probability density function (P($Z_q$)'s) of the quantized image ($Z_q$'s) calculated by the frame histogram calculator 104. A CDF interpolator 108 performs a linear interpolation using Equation (3) on the basis of the cumulative density function (C($Z_q$)'s) of the quantized image ($Z_q$'s) and generates an interpolated cumulative density function value (c($X_k$)'s). Here, k is an integer between 0 and L−1.

Meanwhile, a frame mean calculator 110 calculates a mean level ($X_m$) of a frame-unit input image ($X_k$'s), and provides the calculated mean level ($X_m$) to a CDF memory 114 and first and second mappers 116 and 118 according to a frame synchronous signal (SYNC).

A frame memory 112 stores an input image signal ($X_k$'s) in one frame units. Here, the interpolated cumulative density function value (c($X_k$)'s) is a cumulative density function value of an image signal delayed by one frame compared to a currently-input image signal ($X_k$'s). Thus, in order to input an image signal having the same frame as that of the interpolated cumulative density function value (c($X_k$)'s) to the first and second mappers 116 and 118, the frame memory 112 delays the input image signal ($X_k$'s) by one frame.

The CDF memory 114 renews the cumulative density function value (c($X_k$)'s) interpolated by the CDF interpolator 108 according to a synchronous signal (SYNC) in a frame unit, and provides the interpolated cumulative density function value (c($X_k$)'s) stored during the renewal and a cumulative density function value (c($X_m$)) with respect to the mean level ($X_m$) provided by the frame mean calculator 110. Here, the CDF memory is used as a buffer, and k is an integer between 0 and L−1.

The first mapper 116 receives the interpolated cumulative density function value c($X_k$) and the cumulative density function value c($X_m$) with respect to a mean level which are provided by the CDF memory 114, the mean level ($X_m$) provided by the frame mean calculator 110, and the one-frame-delayed image signal ($X_k$) generated by the frame memory 112, and maps a delayed input image signal smaller than or equal to the mean level ($X_m$) to a gray level ranging from $X_0$ to $X_m$ using Equation (4).

The second mapper 118 receives the interpolated cumulative density function value c($X_k$) and the cumulative density function value $c(X_m)$ with respect to a mean level which are provided by the CDF memory 114, the mean level $(X_m)$ provided by the frame mean calculator 110, and the one-frame-delayed input image signal $(X_k)$ generated by the frame memory 112, and maps a delayed input image signal greater than the mean level $(X_m)$ to a gray level ranging from $X_{m+1}$ to $X_{L-1}$ using Equation (4).

A comparator 120 compares the image signal $(X_k)$ provided by the frame memory 112 with the mean level $(X_m)$ generated by the frame mean calculator 110 and generates a selection control signal. A selector 122 selects either the first or second mapper 116 or 118 according to the selection control signal and generates an enhanced image signal $(Y_H)$. That is, when the image signal $(X_k)$ output by the frame memory 112 is smaller than or equal to the mean level $(X_m)$, the first mapper 116 is selected, otherwise, the second mapper 118 is selected.

Here, instead of a separate frame histogram calculator 104 and a separate CDF calculator 106, one block can calculate a gray level distribution with respect to the quantized image signal $(Z_q\text{'s})$ in one screen units and calculate the CDF of the quantized image signal $(Z_q\text{'s})$ on the basis of the calculated gray level distribution.

Figure 4:
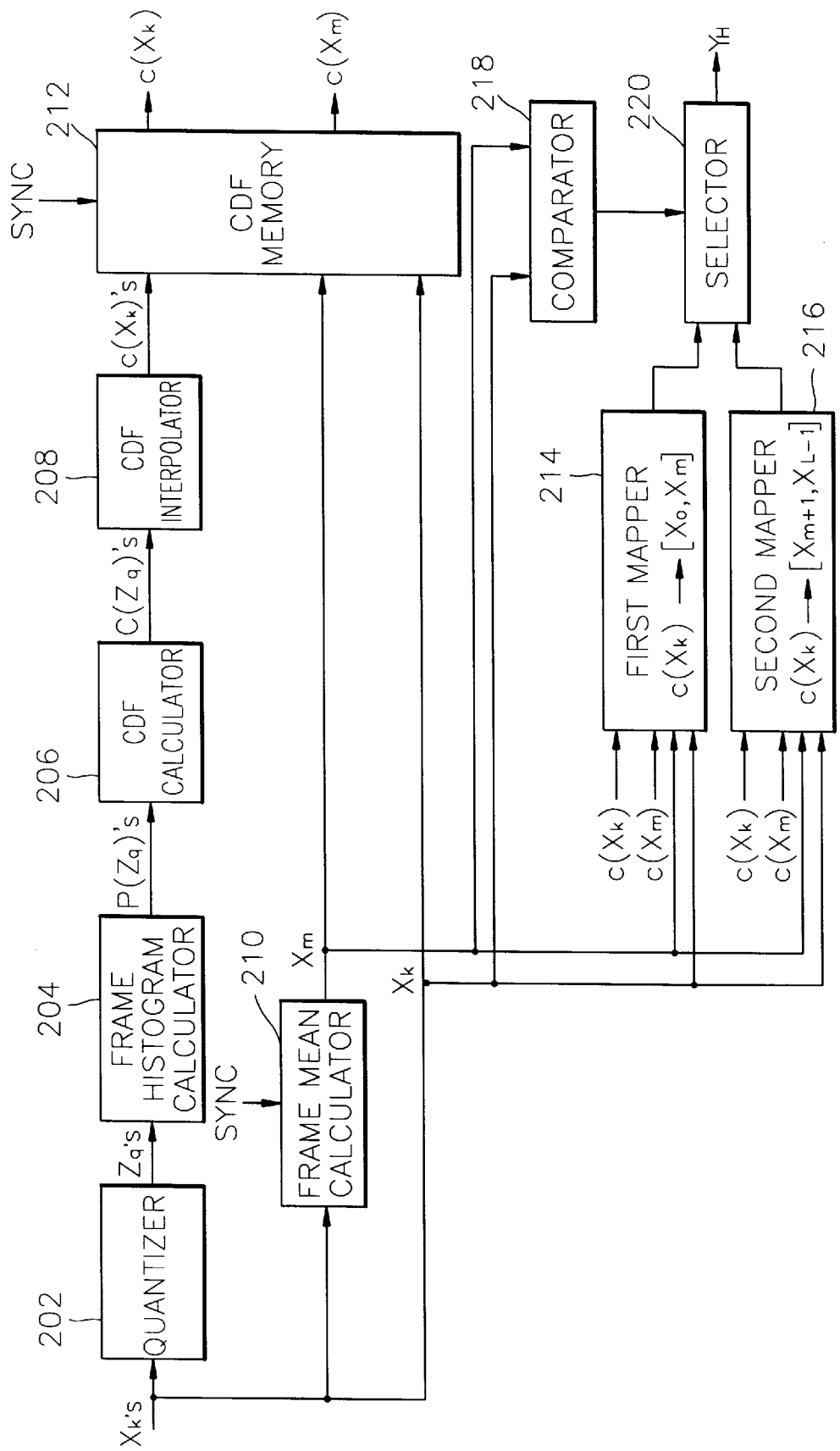
FIG. 4 is a block diagram of an image enhancement circuit according to another embodiment of the present invention.

FIG. 4 is a block diagram of an image enhancement circuit using quantized mean-matching histogram equalization according to another embodiment of the present invention. Referring to FIG. 4, a quantizer 202 quantizes an L-level input image $(X_k\text{'s})$ into a Q-level and generates a quantized image $(Z_q\text{'s})$. A frame histogram calculator 204 calculates the distribution of a gray level with respect to the quantized image $(Z_q\text{'s})$ in a frame unit and calculates a probability density function $(P(Z_q)\text{'s})$ of the quantized image $(Z_q\text{'s})$ using Equation (1).

A CDF calculator 206 calculates a quantized cumulative density function $(C(Z_q)\text{'s})$ using Equation (2) on the basis of the probability density function $(P(Z_q)\text{'s})$ of the quantized image $(Z_q\text{'s})$ calculated by the frame histogram calculator 204. A CDF interpolator 208 performs a linear interpolation using Equation (3) on the basis of the cumulative density function $(C(Z_q)\text{'s})$ of the quantized image $(Z_q\text{'s})$ and generates an interpolated cumulative density function value $(c(X_k)\text{'s})$. Here, k is an integer between 0 and L-1.

Meanwhile, a frame mean calculator 210 calculates a mean level $(X_m)$ of a frame-unit input image $(X_k\text{'s})$, and provides the calculated mean level $(X_m)$ to a CDF memory 212 and first and second mappers 214 and 216 according to a frame synchronous signal (SYNC).

The CDF memory 212 renews the cumulative density function value $(c(X_k)\text{'s})$ interpolated by the CDF interpolator 206 according to the frame synchronous signal (SYNC) in a frame unit, and provides the interpolated cumulative density function value $(c(X_k)\text{'s})$ stored during the renewal and a cumulative density function value $(c(X_m))$ with respect to the mean level $(X_m)$ generated by the frame mean calculator 210. Here, k is an integer between 0 and L-1.

The first mapper 214 receives the interpolated cumulative density function value $c(X_k)$ and the cumulative density function value $c(X_m)$ with respect to a mean level which are provided by the CDF memory 212, the mean level $(X_m)$ provided by the frame mean calculator 210, and the input image signal $(X_k)$, and maps an input image signal smaller than or equal to the mean level $(X_m)$ to a gray level ranging from $X_0$ to $X_m$ using Equation (4).

The second mapper 216 receives the interpolated cumulative density function value $c(X_k)$ and the cumulative density function value $c(X_m)$ with respect to a mean level which are provided by the CDF memory 212, the mean level $(X_m)$ provided by the frame mean calculator 210, and the input image signal $(X_k)$, and maps an input image signal greater than the mean level $(X_m)$ to a gray level ranging from $X_{m+1}$ to $X_{L-1}$ using Equation (4).

At this time, the image signal $(X_k)$ input to the first and second mappers 214 and 216 is an image signal of the next frame compared to the interpolated cumulative density function value $(c(X_k))$ provided by the CDF memory 212. However, a frame memory can be omitted using the fact that a high correlation exists between adjacent frames, thereby reducing the size of the hardware.

A comparator 218 compares the input image signal $(X_k)$ with the mean level $(X_m)$ provided by the frame mean calculator 210 and generates a selection control signal. A selector 220 selects either the first or second mapper 214 or 216 according to the selection control signal and generates an enhanced image signal $(Y_H)$ expressed by Equation (4). That is, when the input image signal $(X_k)$ is smaller than or equal to the mean level $(X_m)$, the first mapper 214 is selected, otherwise, the second mapper 216 is selected.

Figure 5:
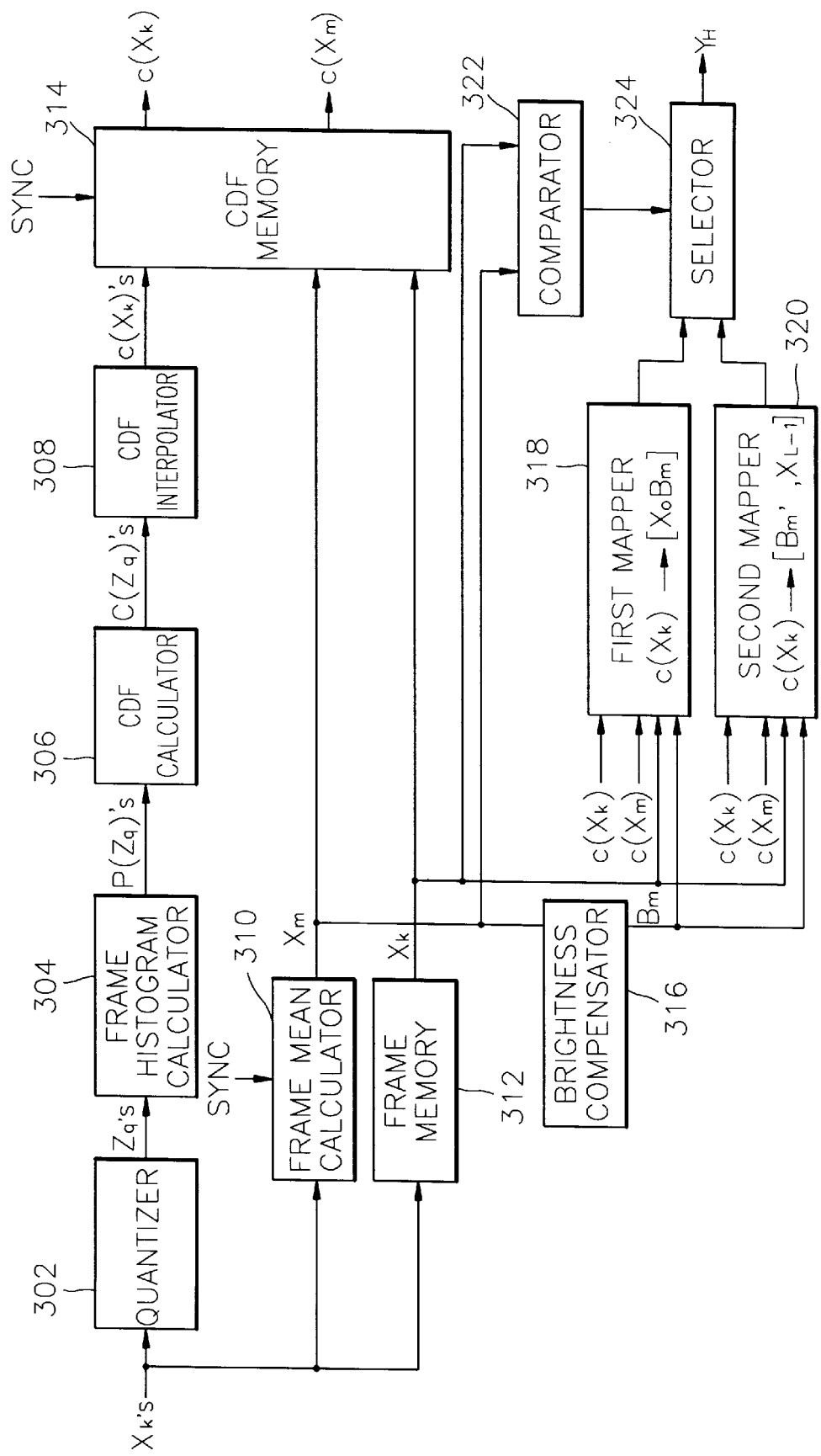
FIG. 5 is a block diagram of an image enhancement circuit according to still another embodiment of the present invention.

FIG. 5 is a block diagram of an image enhancement circuit using quantized mean-matching histogram equalization according to still another embodiment of the present invention. This circuit is identical to the circuit shown in FIG. 3, except that the circuit of this embodiment further includes a brightness compensator 316.

Referring to FIG. 5, the brightness compensator 316 receives a mean level $(X_m)$ generated by a frame mean calculator 310, adds a corrected value $(\Delta)$ depending on the mean brightness of an input image to the mean level $(X_m)$ as shown in Equation (6), and generates a compensated mean level $(B_m)$.

Figure 6A:
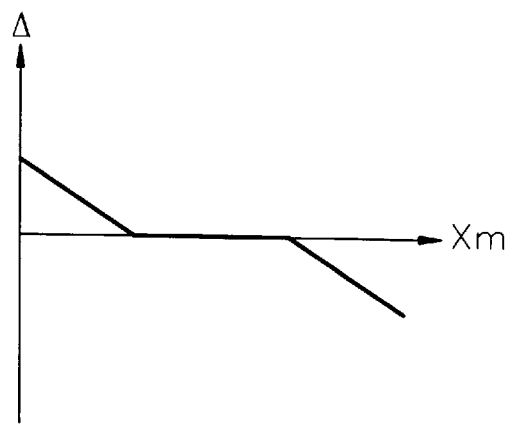
FIGS. 6A and 6B show examples of a brightness correction function which is applied to the brightness compensator shown in FIG. 5.
Figure 6B:
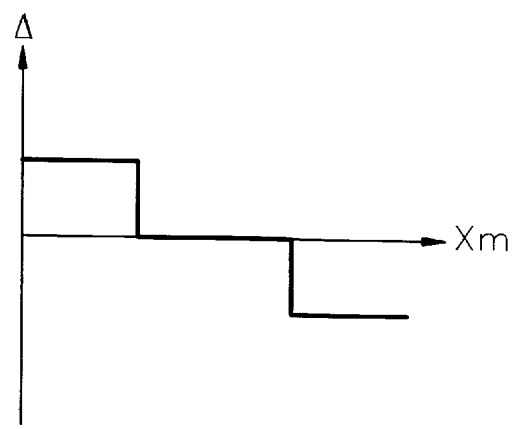

The corrected value $(\Delta)$ is determined by the correction functions shown in FIGS. 6A and 6B. The present invention is not limited to the examples of the correction functions shown in FIGS. 6A and 6B, and other applied examples are possible.

The corrected value depending on the correction functions shown in FIGS. 6A and 6B controls the brightness of the enhanced signal $(Y_H)$. That is, when the mean level $(X_m)$ of an input image is very small, i.e., when the input image is extremely dark, a corrected value $(\Delta)$ being greater than 0 is added to the mean level $(X_m)$ and the quantized mean-matching histogram equalization proposed by the present invention is carried out using Equation (5), thereby increasing the mean brightness of the enhanced signal $(Y_H)$.

Also, when the mean level $(X_m)$ of an input image is very large, i.e., when the input image is extremely bright, a corrected value $(\Delta)$ that is smaller than 0 is added to the mean level $(X_m)$ and the quantized mean-matching histogram equalization proposed by the present invention is carried out using Equation (5), thereby decreasing the mean brightness of the enhanced signal $(Y_H)$. Accordingly, when the quantized mean-matching histogram equalization is performed using a mean level $(B_m)$ compensated by a predetermined adequately corrected value $(\Delta)$ according to the mean level $(X_m)$, the image quality of the input image can be remarkably enhanced.

Figure 7A:
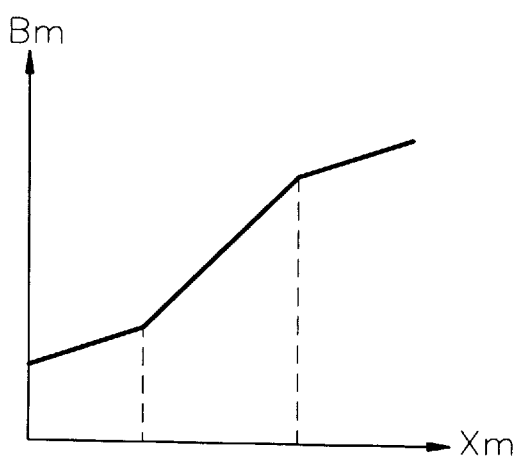
FIGS. 7A and 7B show the relationships between mean levels compensated by the brightness correction functions shown in FIGS. 6A and 6B and the mean level of an input image, respectively.
Figure 7B:
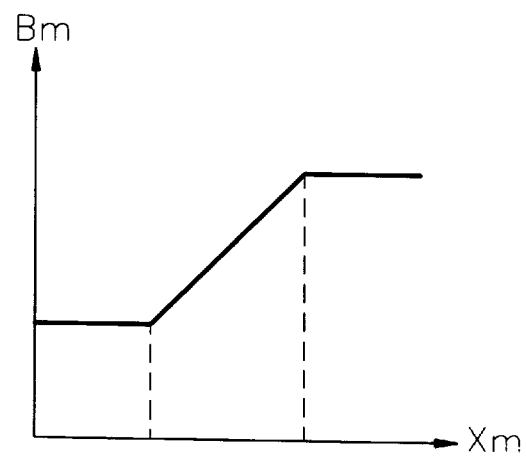

FIGS. 7A and 7B show the relationship between the compensated mean levels $(B_m)$, to which corrected values $(\Delta)$ depending on the correction functions shown in FIGS. 6A and 6B are added, and the mean level $(X_m)$ of an input image.

Meanwhile, a first mapper 318 receives an interpolated cumulative density function value $c(X_k)$ and a cumulative density function value $c(X_m)$ with respect to a mean level which are provided by a CDF memory 314, a compensated mean level ($B_m$) provided by the brightness compensator 316, and a one-frame-delayed image signal ($X_k$) provided by a frame memory 312, and maps an input image signal smaller than or equal to the mean level ($X_m$) to a gray level ranging from $X_0$ to $B_m$ using Equation (5).

A second mapper 320 receives the interpolated cumulative density function value $c(X_k)$ and the cumulative density function value $c(X_m)$ with respect to a mean level which are provided by the CDF memory 314, the compensated mean level ($B_m$) provided by the brightness compensator 316, and the one-frame-delayed input image signal ($X_k$) provided by the frame memory 312, and maps an input image signal greater than the mean level ($X_m$) to a gray level ranging from $B_m'$ to $X_{L-1}$ using Equation (5). The respective outputs of the first and second mappers 318 and 320 are expressed by Equation (5), and $B_m'$ is expressed by Equation (7).

A comparator 322 compares the input image signal ($X_k$) provided by the frame memory 312 with the mean level ($X_m$) provided by the frame mean calculator 310 and generates a selection control signal. A selector 324 selects either the first or second mapper 318 or 320 according to the selection control signal and generates an enhanced image signal ($Y_H$). That is, when the image signal ($X_k$) output by the frame memory 312 is smaller than or equal to the mean level ($X_m$), the first mapper 318 is selected, otherwise, the second mapper 320 is selected.

Figure 8:
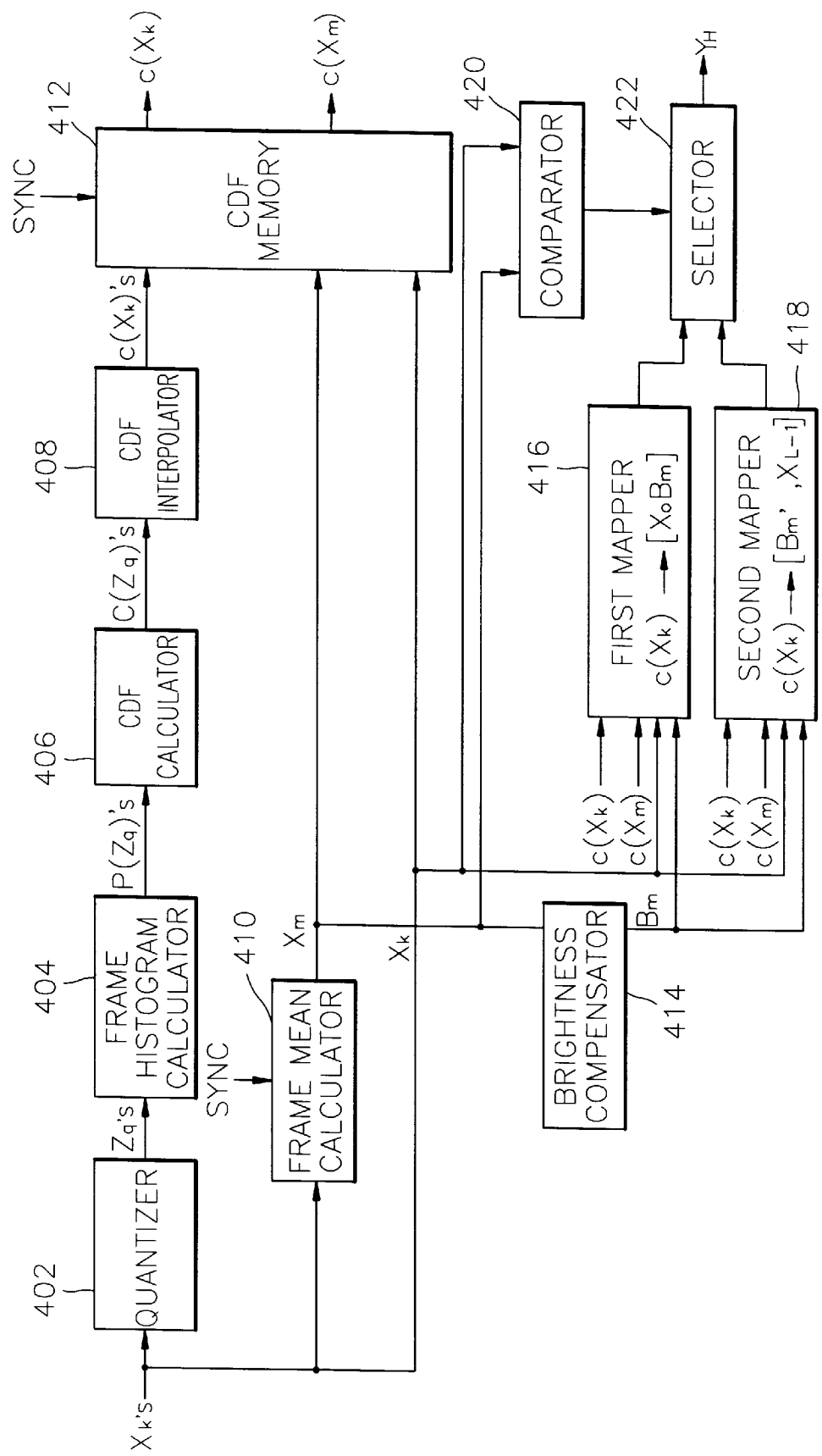
FIG. 8 is a block diagram of an image enhancement circuit according to yet another embodiment of the present invention.

FIG. 8 is a block diagram of an image enhancement circuit using quantized mean-matching histogram equalization according to yet another embodiment of the present invention. Compared with the circuit shown in FIG. 4, the circuit of FIG. 8 further includes a brightness compensator 414. Accordingly, the present embodiment will be described with reference to the brightness compensator 414.

Referring to FIG. 8, the brightness compensator 414 receives a mean level ($X_m$) generated by a frame mean calculator 410, adds a corrected value depending on the mean brightness of an input image to the mean level ($X_m$) as shown in Equation (6), and generates a compensated mean level ($B_m$).

A first mapper 416 receives an interpolated cumulative density function value $c(X_k)$ and a cumulative density function value $c(X_m)$ with respect to a mean level which are provided by a CDF memory 414, a compensated mean level ($B_m$) provided by the brightness compensator 414, and an input image signal ($X_k$), and maps an input image signal smaller than or equal to the mean level ($X_m$) to a gray level ranging from $X_0$ to $B_m$ using Equation (5).

A second mapper 418 receives the interpolated cumulative density function value $c(X_k)$ and the cumulative density function value $c(X_m)$ with respect to a mean level which are provided by the CDF memory 412, the compensated mean level ($B_m$) provided by the brightness compensator 414, and the input image signal ($X_k$), and maps an input image signal greater than the mean level ($X_m$) to a gray level ranging from $B_m'$ to $X_{L-1}$ using Equation (5). The respective outputs of the first and second mappers 416 and 418 are expressed by Equation (5), and $B_m'$ is expressed by Equation (7).

At this time, the image signal ($X_k$) input to the first and second mappers 416 and 418 is an image signal of the next frame compared to the interpolated cumulative density function value ($c(X_k)$) provided by the CDF memory 412. However, in FIG. 8, a frame memory can be omitted since a high correlation exists between adjacent frames, thereby reducing the hardware.

A comparator 420 compares the input image signal ($X_k$) with the mean level ($X_m$) generated by the frame mean calculator 410 and generates a selection control signal. A selector 422 selects either the first or second mapper 416 or 418 according to the selection control signal and generates an enhanced image signal ($Y_H$) expressed by Equation (5). That is, when the input image signal ($X_k$) is smaller than or equal to the mean level ($X_m$), the first mapper 416 is selected, otherwise, the second mapper 418 is selected.

The present invention is applicable to wide-ranging fields associated with image enhancement for an image signal, such as, a broadcasting apparatus, a radar signal processing system, medical technology, home appliances, etc.

As described above, the present invention controls a transform function to map a mean gray level of a given image to itself when histogram equalization is performed according to a cumulative density function approximated by linear interpolation from a quantized cumulative density function of a given image signal. Thus, contrast is enhanced, and the mean brightness of the given image is continuously maintained.

Also, the present invention controls an approximated cumulative density function used as a transform function to map a mean gray level of a given image to an output mean level when histogram equalization is performed according to a cumulative density function approximated by linear interpolation from a quantized cumulative density function of a given image signal. Thus, contrast is enhanced, and the mean brightness of the given image is continuously maintained.

Furthermore, the circuit according to the present invention quantizes an input image signal, and stores and accumulates only the frequencies of generation of the quantized level in order to calculate a CDF during histogram equalization, thereby simplifying necessary hardware and reducing cost.

What is claimed is:

1. An image enhancement method using histogram equalization of an image signal which is represented by a predetermined number of gray levels, said method comprising the steps of:

(a) quantizing a level of an input image signal to generate a quantized image signal;

(b) obtaining a cumulative density function on the basis of a gray level distribution of a screen unit with respect to said quantized image signal to generate a quantized cumulative density function value;

(c) interpolating said quantized cumulative density function value to generate an interpolated cumulative density function value;

(d) calculating a mean level of said input image signal in a screen unit; and (e) controlling a transform function so that said input image signal can be mapped to a gray level and said calculated mean level can be mapped to itself, by using said interpolated cumulative density function as said transform function.

2. An image enhancement method as claimed in claim 1, further comprising the step of (f) delaying said input image signal in a screen unit to generate a delayed image signal for use in step (e).

3. An image enhancement method as claimed in claim 1, wherein said step (c) uses linear interpolation.

4. An image enhancement method as claimed in claim 1, wherein said step (b) comprises the steps of:

obtaining a gray level distribution of said quantized image signal in a screen unit; and generating a quantized cumulative density function value by calculating a cumulative density function on the basis of said gray level distribution of said quantized image signal.

5. An image enhancement method as claimed in claim 1, wherein said step (e) comprises the steps of:

mapping said input image signal to a gray level ranging from a minimum gray level ($X_0$) to a mean level ($X_m$) according to an interpolated cumulative density function value corresponding to said input image signal, and mapping said mean level to itself, when said input image signal is smaller than or equal to said mean level; and mapping said input image signal to a gray level ranging from a gray level ($X_{m+1}$) next to said mean level to a maximum gray level ($X_{L-1}$) according to an interpolated cumulative density function value corresponding to said input image signal when said input image signal is greater than said mean level.

6. An image enhancement method using histogram equalization of an image signal which is represented by a predetermined number of gray levels, said method comprising the steps of:

(a) quantizing a level of an input image signal and outputting a quantized image signal;

(b) obtaining a cumulative density function on the basis of a gray level distribution of a screen unit with respect to said quantized image signal to generate a quantized cumulative density function value;

(c) interpolating said quantized cumulative density function value to generate an interpolated cumulative density function value;

(d) calculating a mean level of said input image signal in a screen unit;

(e) adding a corrected value depending on a predetermined correction function based on a mean brightness of said input image signal to said mean level to generate a compensated mean level; and (f) controlling a transform function so that said input image signal can be mapped to a new gray level on the basis of an interpolated cumulative density function value and said mean level can be mapped to said compensated mean level, by using said interpolated cumulative density function as said transform function.

7. An image enhancement method as claimed in claim 6, further comprising the step of (g) delaying said input image signal in a screen unit to generate a delayed image signal for use in said step (f).

8. An image enhancement method as claimed in claim 6, wherein said step (b) comprises the steps of:

obtaining a gray level distribution of said quantized image signal in a screen unit; and generating a quantized cumulative density function value by calculating a cumulative density function on the basis of said gray level distribution of said quantized image signal.

9. An image enhancement method as claimed in claim 6, wherein said step (c) uses linear interpolation.

10. An image enhancement method as claimed in claim 6, wherein said step (e) comprises the steps of:

generating a compensated mean level by adding a corrected value greater than zero to said mean level when said mean level is very small because of an image being very dark, and generating a compensated mean level by adding a corrected value smaller than zero to said mean level when said mean level is very large because of an image being very bright.

11. An image enhancement method as claimed in claim 6, wherein said step (f) comprises the steps of:

mapping said input image signal to a gray level ranging from a minimum gray level ($X_0$) to a compensated mean level ($B_m$) according to an interpolated cumulative density function value corresponding to said input image signal and mapping said mean level to said compensated mean level, when said input image signal is smaller than or equal to said mean level; and mapping said input image signal to a gray level ranging from a gray level ($B_m'$) to a maximum gray level ($X_{L-1}$) according to an interpolated cumulative density function value corresponding to said input image signal when said input image signal is greater than said mean level, wherein $B_m'$ is equal to $B_m + X_{L-1}/(L-1)$.

12. An image enhancement circuit using histogram equalization of an image signal which is represented by a predetermined number of gray levels, said circuit comprising:

a quantizer for quantizing a level of an input image signal to generate a quantized image signal;

a first calculator for calculating a cumulative density function on the basis of a gray level distribution of a screen unit with respect to said quantized image signal to generate a quantized cumulative density function value;

a second calculator for calculating a mean level of said input image signal in a screen unit;

an interpolator for interpolating said quantized cumulative density function value using a predetermined interpolation to generate an interpolated cumulative density function value; and a mapper for controlling a transform function so that said input image signal can be mapped to a gray level and said mean level calculated by said second calculator can be mapped to itself, by using said interpolated cumulative density function as said transform function.

13. An image enhancement circuit as claimed in claim 12, further comprising a screen memory for delaying said input image signal in a screen unit in order to input an image signal of a same frame as that of said interpolated cumulative density function value to said mapper.

14. An image enhancement circuit as claimed in claim 12, wherein said first calculator comprises:

a frame histogram calculator for calculating a gray level distribution of said quantized image signal in a screen unit; and a cumulative density function calculator for calculating a cumulative density function on the basis of said calculated gray level distribution of said quantized image signal to generate a quantized cumulative density function (CDF) value.

15. An image enhancement circuit as claimed in claim 12, wherein said interpolator uses linear interpolation.

16. An image enhancement circuit as claimed in claim 12, further comprising a buffer for renewing said interpolated cumulative density function value in a screen unit and providing said interpolated cumulative density function value stored during renewal and a cumulative density function value with respect to said mean level.

17. An image enhancement circuit as claimed in claim 16, wherein said mapper comprises:

a first mapper for mapping said mean level to itself and mapping said input image signal, when said input signal is lower than or equal to said mean level, to a gray level having a first range according to an interpolated cumulative density function value corresponding to said input image signal and a cumulative density function value with respect to said mean level;

a second mapper for mapping said input image signal, when said input image signal is higher than said mean level, to a gray level having a second range according to an interpolated cumulative density function value corresponding to said input image signal and a cumulative density function value with respect to said mean level;

a comparator for comparing said input image signal with said mean level and generating a selection control signal; and a selector for selecting said first mapper in accordance with said selection control signal when said input image signal is lower than or equal to said mean level, and selecting said second mapper in accordance with said selection control signal when said input image signal is higher than said mean level.

18. An image enhancement circuit as claimed in claim 13, wherein said mapper comprises:

a first mapper for mapping said mean level calculated by said second calculator to itself and mapping said image signal, when said image signal is a level lower than or equal to said mean level provided by said screen memory, to a gray level having a first range according to an interpolated cumulative density function value corresponding to said input image signal and a cumulative density function value with respect to said mean level;

a second mapper for mapping said image signal, when said image signal is a level higher than said mean level provided by said screen memory, to a gray level having a second range according to an interpolated cumulative density function value corresponding to said input image signal and a cumulative density function value with respect to said mean level;

a comparator for comparing said image signal output by said screen memory with said mean level and generating a selection control signal; and a selector for selecting said first mapper in accordance with said selection control signal when an image signal provided by said screen memory is lower than or equal to said mean level, and selecting said second mapper in accordance with said selection control signal when an image signal provided by said screen memory is higher than said mean level.

19. An image enhancement circuit using histogram equalization of an image signal which is represented by a predetermined number of gray levels, said image enhancement circuit comprising:

a quantizer for quantizing the level of an input image signal to generate a quantized image signal;

a first calculator for calculating a cumulative density function on the basis of a gray level distribution of a screen unit with respect to said quantized image signal to generate a quantized cumulative density function value;

a second calculator for calculating a mean level of an input image signal in a screen unit;

a brightness compensator for generating a compensated mean level by adding a corrected value depending on a predetermined correction function based on the mean brightness of said input image signal to said mean level;

an interpolator for interpolating said quantized cumulative density function value using a predetermined interpolation to generate an interpolated cumulative density function value; and a mapper for controlling a transform function so that said input image signal can be mapped to a new gray level and said mean level can be mapped to said compensated mean level, by using said interpolated cumulative density function as said transform function.

20. An image enhancement circuit as claimed in claim 19, further comprising a screen memory for delaying said input image signal in a screen unit in order to provide an image signal of a same frame as that of said interpolated cumulative density function value to said mapper.

21. An image enhancement circuit as claimed in claim 19, wherein said first calculator comprises:

a frame histogram calculator for calculating a gray level distribution of said quantized image signal in a screen unit; and a cumulative density function calculator for calculating a cumulative density function on the basis of said calculated gray level distribution of said quantized image signal to generate a quantized cumulative density function (CDF) value.

22. An image enhancement circuit as claimed in claim 19, wherein said brightness compensator generates a compensated mean level by adding a corrected value greater than zero to said mean level when said mean level is very small because of an image being very dark, and generates a compensated mean level by adding a corrected value smaller than zero to said mean level when said mean level is very large because of an image being very bright.

23. An image enhancement circuit as claimed in claim 19, wherein said interpolator uses linear interpolation.

24. An image enhancement circuit as claimed in claim 19, further comprising a buffer for renewing said interpolated cumulative density function value in a screen unit and generating said interpolated cumulative density function value stored during renewal and a cumulative density function value with respect to said mean level.

25. An image enhancement circuit as claimed in claim 19, wherein said mapper comprises:

a first mapper for mapping said input image signal to a gray level ranging from a minimum gray level ($X_0$) to a compensated mean level ($B_m$) according to an interpolated cumulative density function value corresponding to said input image signal when said input image signal is lower than or equal to said mean level, and mapping said mean level to said compensated mean level;

a second mapper for mapping said input image signal to a gray level ranging from $B_m'$ to a maximum gray level ($X_{L-1}$) according to an interpolated cumulative density function value corresponding to said input image signal when said input signal is higher than said mean level, wherein $B_m'$ equals $B_m+X_{L-1}/(L-1)$;

a comparator for comparing said input image signal with said mean level and generating a selection control signal; and a selector for selecting said first mapper in accordance with said selection control signal when an input image signal is lower than or equal to said mean level, and selecting said second mapper in accordance with said selection control signal when selecting said second mapper is higher than said mean level.

26. An image enhancement circuit as claimed in claim 20, wherein said mapper comprises:

a first mapper for mapping said image signal to a gray level ranging from a minimum gray level ($X_0$) to a compensated mean level ($B_m$) according to an interpolated cumulative density function value corresponding to said input image signal when said image signal has a level lower than or equal to said mean level provided by said screen memory, and mapping said mean level to said compensated mean level;

a second mapper for mapping said image signal to a gray level ranging from $B_m{}'$ to a maximum gray level ($X_{L-1}$) according to an interpolated cumulative density function value corresponding to said input image signal when said image signal has a level higher than said mean level provided by said screen memory, wherein $B_m{}'$ is equal to $B_m + X_{L-1}/(L-1)$, a comparator for comparing said image signal output by said screen memory with said mean level and generating a selection control signal; and a selector for selecting said first mapper in accordance with said selection control signal when said image signal provided by said screen memory is lower than or equal to said mean level, and selecting said second mapper in accordance with said selection control signal when said image signal provided by said screen memory is higher than said mean level.

* * * * *